United States Patent [19]

Dunaway et al.

[11] Patent Number: 4,798,630

[45] Date of Patent: Jan. 17, 1989

[54] PROCESS FOR SURFACE TREATING CLAY MINERALS AND REACTIVE INTERMEDIATES PRODUCED BY SAID PROCESS

[75] Inventors: Weyman H. Dunaway; Jorge E. Salinas, both of Sandersville, Ga.

[73] Assignee: E.C.C. America Inc., Atlanta, Ga.

[21] Appl. No.: 875,273

[22] Filed: Jun. 17, 1986

Related U.S. Application Data

[63] Continuation-in-part of Ser. No. 493,357, May 10, 1983, abandoned.

[51] Int. Cl.$^4$ .................................................. C09K 3/00
[52] U.S. Cl. .................................. 106/287.1; 106/468; 106/487; 502/62; 502/63; 502/80
[58] Field of Search .............. 423/325, 326, 328, 341, 423/116, 133, 111, 118, 130; 75/2, 68 B, 113; 502/62, 63, 80; 524/261, 262; 106/308 Q, 308 N, 288 B, 288 Q, 287.1

[56] References Cited

U.S. PATENT DOCUMENTS

| | | | |
|---|---|---|---|
| 3,227,675 | 1/1966 | Papalos | 524/114 |
| 3,290,165 | 11/1966 | Iannicelli | 106/308 N |
| 3,567,680 | 2/1971 | Iannicelli | 524/262 |
| 3,980,586 | 9/1976 | Mitchell | 502/64 |
| 4,120,937 | 10/1978 | Blount | 423/325 |

*Primary Examiner*—Robert L. Stoll
*Attorney, Agent, or Firm*—Stefan J. Klauber

[57] ABSTRACT

A method for chlorinating a clay mineral starting composition to produce reactive chloride intermediates, comprising: reacting said composition in substantially dry particulate form with gaseous $SiCl_4$ to activate the surface of said composition, thereby forming said reactive chloride intermediate, said reaction being conducted at temperatures below that at which volatilization or dehydration of the starting composition will occur. The resulting compounds are highly reactive intermediates, which can then be functionalized by reaction with a large group of organics, or organic derivatives.

10 Claims, No Drawings

PROCESS FOR SURFACE TREATING CLAY MINERALS AND REACTIVE INTERMEDIATES PRODUCED BY SAID PROCESS

RELATED APPLICATION

This application is a continuation-in-part of our co-pending application, Ser. No. 493,357, filed May 10, 1983, now abandoned.

BACKGROUND OF THE INVENTION

This invention relates generally to silicates and siliceous compositions, including siliceous minerals, such as aluminosilicates and the like, and more specifically relates to a method for chlorinating materials of this type in order to produce intermediates having new and unusual properties enabling subsequent functionalization thereof.

It has long been known to treat silicates, siliceous minerals and the like, with halides, specifically including gaseous chlorine, for the purpose of producing chlorides for various industrial and other applications. Clays, for example, are generally fine grained, earthy material made up of minerals which are essentially hydrous aluminosilicates. Numerous processes have been utilized for recovering aluminum from clays, which involve a chlorination step, and which are conducted at relatively very high temperatures. These processes generally produce aluminum chloride, which is further reacted to ultimately produce the desired aluminum.

In other instances, high temperature reactions of silicates or siliceous materials or minerals with chlorine have been utilized for the production of hydroxide-free silica for optical glasses. Additional prior art bearing upon the present invention include the following:

In Moore et al, U.S. Pat. No. 3,236,606, hot chlorine containing gaseous compounds are utilized in the bleaching of clay in a reactor in which fuel and air is present, and temperatures of the order of 600° to 1200° C.

British Patent Specification No. 894,383 teaches subjecting a kaolin clay to shock heating and thereafter to bleaching of same by treatment with chlorine gas at 700° to 900° C.

Nordberg, U.S. Pat. No. 2,141,444, discloses the use of carbon and chlorine in the course of removing iron from high alumina materials, including kaolin, kyanite, bauxite, diaspore, and the like, by heating the materials in the presence of the said components at temperatures of 900° to 1150° C.

Hall, U.S. Pat. No. 1,405,115, teaches the manufacture of aluminum chloride by contacting alumina, sulphur and chlorine at temperatures sufficient to yield the aluminum chloride and sulphur dioxide.

Hall, U.S. Pat. No. 1,422,568, teaches a process for manufacturing aluminum chloride which consists in maintaining an atmosphere of chlorine and sulphur vapors in a heated chamber and blowing a powdered aluminum compound thereinto.

Toth, U.S. Pat. No. 3,615,359, teaches a process for producing aluminum involving conversion of alumina under reducing conditions in the presence of carbon with manganese chloride to form aluminum trichloride and manganese, the reaction taking place in a first reaction zone the temperature of which is about 190° C. at the inlet and 1400° C. at the outlet of the zone, and then reacting the latter at a temperature of up to about 1400° C., to reduce the aluminum trichloride to aluminum, by reacting the manganese with the said aluminum trichloride.

Willhoft, U.S. Pat. No. 4,073,872, discloses a process for recovering aluminum values from aluminum containing minerals such as bauxite and aluminosilicates, including kaolinite and the like. The aluminum containing mineral, together with carbon, is chlorinated to recover aluminum chloride. The process involves heating an intimate mixture of an aluminum-containing mineral and a solid carbonizable organic material, so as to carbonize the organic material, and chlorinating the solid residue from the carbonization step. The temperature of reaction may be up to 1500° C., but is preferably slightly lower than the carbonization temperature, for example, in the range of 500° C. to 800° C.

Wyndham et al, U.S. Pat. No. 4,082,233, describes a method for carbo-chlorinating clay to produce aluminum chloride and silicon chloride. The clay is initially calcined with a solid carbonaceous reductant to form a reaction mass. Carbo-chlorination, in the presence of a sulphur-containing member, is conducted at temperatures within the range of from about 400° C. to about 1000° C.

Wyndham et al, U.S. Pat. No. 4,083,927, relates to further improvements for carbo-chlorination of clays which have previously been calcined. The reaction mixture during carbo-chlorination is in the temperature range of 600° C. to 950° C., using dry chlorine to which is added about 0.3% to 2.5% by volume of boron chloride.

Martin et al, U.S. Pat. No. 4,096,234, discloses the production of aluminum chloride from clay by chlorinating the clay through contact with a mixture consisting of a chlorinating agent, a reducing agent, an alkaline metal compound catalyst and silicon chloride. The chlorination process is carried out in a fluidized bed at a temperature of 550° C. to 650° C.

Wyndham et al, U.S. Pat. No. 4,139,602, relates to the preferential chlorination of alumina in kaolinitic ore feed materials to produce aluminum chloride. The process utilizes carbo-chlorination; the kaolin clay is initially dried, comminuted, and calcined in the temperature ranging from 500° C. to 1000° C. The carbo-chlorination is effected in the temperature range of from 600° C. to 1000° C.

Martin, U.S. Pat. No. 4,213,943, discloses a process for producing aluminum chloride from clay containing aluminum oxide and silicon oxide, by a 2-step chlorination process. Chlorination is effected at 550° C. to 650° C.

Dell, U.S. Pat. No. 4,244,935, discloses a method for chlorinating particles of a substance containing metal and oxygen, utilizing a coking step carried out in a temperature range of 450° to 650° C., followed by a heating step carried out between 700° to 1100° C.

Reynolds et al, U.S. Pat. No. 4,288,414, discloses a process for recovering aluminum from clays associated with coal or bauxite containing iron, siliceous material and titanium, comprising chlorinating the material at temperatures of from about 650° C. to 900° C., in an oxidizing atmosphere in the presence of added oxygen; and then chlorinating the residue from the said step with chlorine at a temperature of from about 600° C. to 850° C., in a reducing atmosphere of carbon monoxide.

Dunn, U.S. Pat. No. 4,355,007, discloses a two stage process for chlorinating aluminum value-containing materials such as bauxite, clay, etc. The material is dehydrated, and then chlorinated in the presence of chlorine and carbon at a temperature of below about 1200° K. (temperature of about 1100° K. is typical); oxygen is introduced, and thereafter the non-gaseous product is chlorinated in the presence of chlorine and carbon at a temperature above about 1300° K.

U.S. Pat. Nos. 4,355,008 and 4,363,789, each to Dunn Jr. are similar to Dunn Jr. U.S. Pat. No. 4,355,007, to the extent that chlorination is involved in the course of producing aluminum from a material containing alumina values via chlorination.

In the instance of kaolin clays, it has long been recognized that products having new properties and uses could be formulated by combining these aluminosilicates with organic materials. However, any useful progress in this direction has tended to be limited by the lack of available covalent bonding at the mineral/organic interface. In the past this difficulty has been partially overcome by surface modification of the kaolinite through the use of various coupling agents—such as organotitanates, organosilanes, organo aluminozirconates, etc.

Thus, in Papalos U.S. Pat. No. 3,227,675, for example, kaolin clays are described, the surfaces of which are modified with organofunctional silanes. A typical such agent e.g. is a methacryloxypropyltrimethoxy silane. The kaolin clays so modified are advantageously used as fillers for natural and synthetic rubbers and the like. It is also pointed out in this patent that such modified products can serve as intermediates for synthesis of new pigments, which are useful as fillers for polymers, elastomers and resins. This result obtains because the silanes used to modify the kaolin clays are di- or polyfunctional, and only one functional group, the silane, is attached to the clay, leaving the remaining reactive groups to react further.

Additional references of this type include Iannicelli U.S. Pat. No. 3,290,165, and Iannicelli U.S. Pat. No. 3,567,680.

However, the modification of aluminosilicates such as kaolin clays by the use of organosilanes, is a complicated and expensive process. Among other things, the cost of the organosilane itself is very high. Furthermore, the resulting products have only limited capability for further functionalization, regardless of the particular organosilanes utilized.

In accordance with the foregoing, it may be regarded as an object of the present invention, to provide a relatively simple, inexpensive and effective process, which enables activation of the surfaces of clay minerals, to form reactive chloride intermediates, which are eminently capable of subsequent functionalization with organic groups and the like.

It is a further object of the invention to provide a process for reacting siliceous materials, such as clay minerals, with gaseous $SiCl_4$, to activate the surface of same and thereby form reactive chloride intermediates, which process may be practiced on a very wide variety of such materials, including numerous types of clays, such as those of the kaolin group, montmorillonite group, illite group, etc.

SUMMARY OF THE INVENTION

Now in accordance with the present invention, the foregoing objects, and others as will become apparent in the course of the ensuing specification, are achieved in a method for chlorinating clay minerals, such as kaolins, bentonites or the like, to produce highly reactive intermediates, comprising reacting the said composition in substantially dry particulate form with gaseous $SiCl_4$ to activate the surface of same and thereby form reactive chloride intermediates, the said reaction being conducted at temperatures below that which would otherwise substantially alter the starting material.

The said reaction is conducted at temperatures above the boiling point of said $SiCl_4$ (56° C.) and below about 300° C., and preferably in the range of from about 60° C. to 110° C. These temperatures are such as to be below that at which volatilization or dehydration of the starting material will occur. Thus the starting materials are not otherwise substantially chemically or physically altered in the course of the process, as to lose their basic properties. For example a hydrous kaolin clay treated by the invention is not altered to a calcined kaolin; hence its low abrasion properties are in no way detrimentally affected by the present method.

The said reaction may be conducted in any apparatus wherein intimate contact between the particulate material and the gaseous reactants is possible. These include mechanical mixers, such as high shear mixers. Similarly, the reaction can be conducted in a fluidized bed reactor with the gaseous components passing upwardly through a suitable diffuser plate, and into a fluidized bed of the particulate material being treated. A dry inert gas, such as nitrogen or argon, which is warmed prior to intermixing, can be used as a carrier for the $SiCl_4$. Typical reaction times are from about 1 minute (or less) to about 15 minutes.

The quantity of $SiCl_4$ used in the reaction will vary in accordance with the surface area characteristics and the available reaction sites in the starting-material. In the instance of kaolin clays, for example, the quantity of $SiCl_4$ is preferably such as to provide from about 1 to 5 milliequivalents of chlorine per 100 grams of the starting material. However, greater quantities of $SiCl_4$ can be reacted, at least up to the stoichiometric quantity appropriate to fully react with all available $=O$ and $-OH$ groups of the starting material.

Various clay minerals may be treated by the method of the invention. Thus, for example, clays of the halloysite, illite, kaolinite, montmorillonite, and polygorskite groups, can be readily treated by the present invention.

The intermediates prepared by use of the present process are highly reactive, and will decompose by hydrolysis if substantial moisture is present. For such reason, once the said intermediates are prepared, and until they are used, they must be maintained in a substantially dry state, which is preferably accomplished by maintaining such intermediates under a dry inert blanket, i.e. a dry inert gas atmosphere—such as nitrogen.

The functionalization of the chlorinated intermediates can be achieved by various methods, such as contacting same under suitable reaction conditions with compounds having active organic groups, such as organo-metallic compounds. The reaction can be carried out with the functionalizing reactant in the gaseous phase, in the liquid phase, or in a system containing inert organic solvents. These reactions can be effected by various techniques, for example in many instances by simple mixing of the intermediates with the reactants.

A large variety of groups can be used to functionalize the intermediates; for example alkyls, allyls, aryls, mercapto, amines, etc. Although Applicants do not wish to be bound by any particular hypothesis, a possible reaction in the present invention, may be as follows:

The starting material utilized in the practice of this invention, as for example a kaolin clay, or the like, has present in the surface layer thereof, oxide and hydroxide groups, i.e. =O and —OH groups. Silicon tetrachloride thus reacts with these silicates to form a very stable Si-O-Si-(siloxane) bond. The reaction takes place in three different ways:

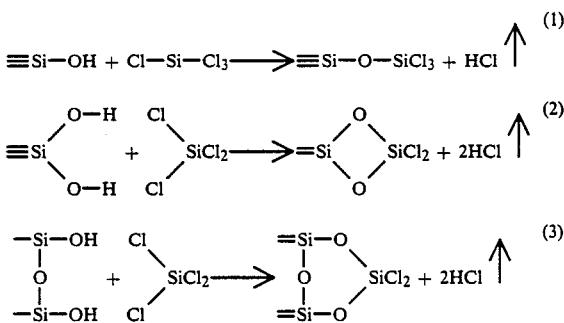

All these reactions produce a surface silicon-chloride which is a very powerful intermedidate and can be reacted with compounds containing active organic groups to form new stable compounds.

The stable chlorinated intermediate thus undergoes nucleophilic substitution when reacted with functional compounds, for example metallic alkyls, such as aluminum alkyls. Although the bond energy of the silicon-chlorine bond is higher than the energy of the silicon-carbon bond, the halide bond will react with the organic residue of the organo-metallic reactant to form a silicon-carbon bond. The silicon-chlorie bond is a more polar bond, allowing nucleophilic attack on the silicon or electrophilic attack on the chlorine, thus making it very reactive and susceptible to attack. The silicon-carbon bond is not a very polar bond, thus a very stable bond, and it is preferred in the reaction.

DESCRIPTION OF THE PREFERRED EMBODIMENT

The invention will now be illustrated by a series of Examples, which, however, are to be considered as merely exemplary of practice of the invention, and not as delimitive thereof.

EXAMPLE I

In these Examples, five different 50 gram samples were reacted in accordance with the invention with the silicon tetrachloride. The samples specifically included:

(1) An air-floated kaolin clay having a particle size distribution such that 88% by weight of the particles were of less than 2 micrometers ESD. The B.E.T. surface area of this sample was 10.8 m$^2$/g.

(2) The Alphatex® product of Anglo-American Clays Corporation, Atlanta, Ga., which is a calcined kaolin clay product of relatively fine particle size exhibiting high light-scattering characteristics and used especially as a filler and also as a coating pigment for papers;

(3) A Georgia bentonite which had a B.E.T. surface area of 100.5 m$^2$/g.

(4) A relatively fine kaolin clay crude, which was merely blunged and degritted with no further classification. The resulting material was 86% by weight less than 2 micrometers, and 79% by weight less than 1 micrometer, and had a B.E.T. surface area of 23.5 m$^2$/g; and (5) A kaolin clay which as a crude, initially had a particle size distribution such that 90% by weight of the particles were of less than 2 micrometers ESD, the material being further classified into a fine fraction, consisting of 95% by weight less than 1 micrometers ESD, and a coarse fraction. The fine fraction, which had a B.E.T. surface area of 24.5 m$^2$/g was used in this Example.

Each of the above five samples was initially dried for between 30 minutes and 1 hour at 150° C. in an oven. The samples were then transferred into a Waring blender container, which had been preheated to 100° C., which temperature was maintained relatively constant in the said container. This container was purged with argon to assure that the atmosphere was an inert blanket of argon.

Silicon tetrachloride was bubbled through a clean dry Dudley bubbler, and passed via a Teflon® tubing into the blender jar. The bubbler was maintained in a water bath at 65° C. The said silicon tetrachloride was introduced in accompaniment of argon as a carrier, while the blender was operating. In the instance of each sample, a different pre-measured quantity of SiCl$_4$ was used, as was appropriate to yield a desired number of chlorine milliequivalents for the quantity of the particular sample. The quantity of silicon tetrachloride varied between 0.2 and 2 ml. The vapors from the silicon tetrachloride were exuded into the argon atmosphere, with the blender then being run for an additional period. The resulting clay samples were transferred still under argon, and tested for chloride content via a specific ion meter.

It was found that the samples above set forth had the following chloride content in milliequivalents (M.E.Q.) of chlorine per 100 gram sample:

TABLE I

| Sample | B.E.T. Surface Area in m$^2$/g | M.E.Q. of Chlorine/100 g |
| --- | --- | --- |
| 1. Air-float kaolin | 10.8 | 1.87 |
| 2. Alphatex ® calcined clay | — | 1.18 |
| 3. Georgia bentonite | 100.5 | 15.13 |
| 4. Fine kaolin clay | 23.5 | 4.65 |
| 5. Very fine kaolin clay | 24.5 | 2.72 |

EXAMPLE II

The air float clay sample (1) from the preceding Example was thereupon subjected to functionalization by being processed under argon. Specifically, 50 grams of the sample resulting from processing in accordance with Example I of the air float sample, were placed in a clean, dry blender container. An aluminum alkyl, specifically tri-N-butyl-aluminum in the quantity of 1.5 ml, was added to the said sample. Mixing was continued for 5 minutes. Then the sample was dried in an oven and subjected to testing.

The resultant functionalized product was found to have markedly different properties than the starting kaolin clay. In particular, the functionalized product, along with the untreated kaolin clay starting material, were subjected to evaluation by a wetout test. This wetout test consists of placing a known volume of water in a beaker, then pouring a known weight of the sample on top of the water in the beaker with no agitation of any type, and measuring the time it takes for the clay to drop below the surface of the water. When subjected to such wetout test, it was found that the said product was hydrophobic in nature. While it took only 15 seconds for the starting material to wetout, the functionalized material required 113 seconds to drop below the water surface. Furthermore, even after 48 hours a major portion of the new material remained in suspension as discrete particles, whereas the starting material settled completely in about 35 minutes. The product was further shown to be extremely organophilic in that it was wetout in hexane in less than 10 seconds while normal kaolin clay shows little or no tendency to be wetout by organic solvents such as hexane.

While the present invention has been particularly set forth in terms of specific embodiments thereof, it will be understood in view of the instant disclosure, that that numerous variations upon the invention are now enabled to those skilled in the art, which variations yet reside within the scope of the present teaching. Accordingly, the invention is to be broadly construed, and limited only by the scope and spirit of the claims now appended hereto.

We claim:

1. A method for chlorinating and functionalizing an aluminosilicate clay mineral starting composition, comprising:
reacting a said clay mineral composition selected from one or more members of the group consisting of clays of the halloysite, illite, kaolinite, montmorillonite, and polygorskite groups in substantially dry particulate form with gaseous $SiCl_4$ to activate the surface of said composition, thereby forming a reactive chloride intermediate, said reaction being conducted at temperatures in the range of from about 56° C. to below 300° C.; maintaining said intermediate in a substantially dry state until used for further reaction; and thereafter functionalizing said intermediate with an active organic group.

2. A process in accordance with claim 1 wherein said process is conducted at temperatures in the range of from about 60° to 110° C.

3. A method in accordance with claim 1 wherein said $SiCl_4$ is mixed with a dry inert gas carrier.

4. A method in accordance with claim 1, wherein said reaction is conducted in apparatus for contacting particulate solids with gases.

5. A method in accordance with claim 1, wherein said mineral comprises a kaolin.

6. A method in accordance with claim 1, wherein said mineral comprises a montmorillonite.

7. A method in accordance with claim 6, wherein said mineral comprises a bentonite.

8. A method in accordance with claim 2, wherein said mineral comprises a kaolin.

9. A method in accordance with claim 2, wherein said mineral comprises a montmorillonite.

10. A method in accordance with claim 2, wherein said mineral comprises a bentonite.

* * * * *